(12) United States Patent
Imbornone et al.

(10) Patent No.: US 11,512,714 B1
(45) Date of Patent: Nov. 29, 2022

(54) VACUUM PUMP SILENCER

(71) Applicant: Eagletree-Pump Acquisition Corp., New York, NY (US)

(72) Inventors: Vincent Imbornone, Union, NJ (US); Raphael Sagher, Alpine, NJ (US)

(73) Assignee: AIRTECH GROUP, INC., Rutherford, NJ (US)

( * ) Notice: Subject to any disclaimer, the term of this patent is extended or adjusted under 35 U.S.C. 154(b) by 925 days.

(21) Appl. No.: 16/358,198

(22) Filed: Mar. 19, 2019

(51) Int. Cl.
  *F04D 29/66* (2006.01)
  *G10K 11/162* (2006.01)

(52) U.S. Cl.
  CPC ......... *F04D 29/667* (2013.01); *F04D 29/663* (2013.01); *G10K 11/162* (2013.01)

(58) Field of Classification Search
  CPC .................................................... F04D 29/663
  See application file for complete search history.

(56) References Cited

U.S. PATENT DOCUMENTS 7,753,167 B2 * 7/2010 Fukano ................ F15B 21/008
                                          181/158
9,939,072 B2 * 4/2018 Wyatt ................ F16K 17/0433

* cited by examiner

*Primary Examiner* — Sabbir Hasan
(74) *Attorney, Agent, or Firm* — Thomas M. Galgano, Esq.; Galgano IP Law PLLC

(57) ABSTRACT

A silencer assembly especially designed for attachment to the exhaust port of vacuum pumps and which adapts to the pumps pressure changes to regulate the outlet flow. The silencer features a perforated housing having an inner channel which connects to the discharge port of the vacuum pump and a valve assembly having a spring-loaded ball for dynamically regulating the fluid flow through the perforated housing. Once the pressure of the flow from the pump is high enough to compress a spring by pushing on a rubber ball which acts as a valve, a channel opens inside the silencer and the air can be vented through the radially distributed perforations on the housing. As the air escapes, the noise caused by the flow is reduced.

9 Claims, 2 Drawing Sheets

VACUUM PUMP SILENCER

BACKGROUND OF THE INVENTION

1. Field of the Invention

The invention relates to the field of noise reducing devices. More particularly, the invention pertains to a dynamically-adjusting silencer for gas discharge devices such as vacuum pumps. More specifically, it relates to a silencer that uses the variation of a vacuum pump's exhaust fluid to adjust the exhaust flow by using a spring in compression in between a ball, used as a valve, and a setting plug. The assembly allows for the reduction of the noise generated by the gas discharged from a vacuum pump by obstructing and diverting the exhaust flow.

2. Description of Related Art

Silencer and mufflers are a well-established technology in the field of discharge gas devices. The noise created by the exhaust gas is increased if discharged into the surrounding atmosphere or ambient environment, and it is known in the art to use silencers, e.g., silencers connected to the outlet port to dissipate the noise. In certain applications, for instance, home appliances, it is critical to bring the noise levels down to an acceptable level. Most of the existing silencers presently used for discharge gas are static assemblies which comprise an expansion chamber and sound absorbing material, such as pleated filters, cartridges or bags.

Accordingly, it is an object of the present invention to provide a novel silencer for discharge gas devices, such as blowers and vacuum pumps for reducing the noise generated by the fluid discharge at the discharge port of the pump.

It is a further object of the present invention to provide such a novel silencer which is relatively simple in design, compact, easy to use and inexpensive.

It is more particularly an object of the present invention to provide such a novel silencer for vacuum pumps which employs valve means for dynamically regulating the vacuum pump exhaust flow without external input or intervention.

SUMMARY OF THE INVENTION

Certain of the foregoing and related objects are readily attained according to the present invention by the provision of an assembly comprising a housing inside of which are located a spring compressed by a setting plug and a ball that operates as a valve. The housing has a channel to circulate the flow from the discharge port of a vacuum pump to perforated outlet holes around the housing circumference. During its operation, the silencer dynamically regulates the vacuum pump flow without external intervention. Depending on the compression setting of the spring, the exhaust flow pushes on the ball which compresses the spring, and which creates a passage for the air toward the exhaust perforations.

Certain of the foregoing and related objects are also readily attained according to the present invention by the provision of a novel silencer for reducing the noise generated by the fluid discharge at the discharge port of a pump, comprising a housing having an inlet end attachable to a discharge port of a pump and an inner channel having an inlet port for receiving the fluid discharge of the pump and a plurality of outlet ports for discharge of said fluid received from said discharge port of a pump, and valve means disposed in said housing for regulating the discharge rate of fluid through said outlet ports in response to said exhaust fluid flow discharge from the pump.

Preferably, the valve means comprises a coil spring and a ball forming a valve that opens under the pressure of the exhaust flow, and allows for the fluid to escape through said plurality of outlet ports. The valve means desirably includes a set screw for adjusting the biasing force of the spring against said ball.

In a preferred embodiment of the invention, the housing has a tubular front end portion which defines said inlet end and inlet port of said inner channel and wherein said front end portion has an inner surface defining a rounded shoulder in said inner channel which serves as a valve seat for said ball. Most advantageously, the housing has a tubular middle portion with a plurality of holes extending therethrough which serve as said outlet ports and a rear tubular portion with a polygonally shaped outer surface and an internally threaded inner surface. Most desirably, the set screw is externally threaded for threadably engagement with said internally threaded inner surface of said rear tubular portion to allow positional adjustment of said set screw in said rear tubular portion, to, in turn, adjust the biasing force of said spring against said ball.

In a particularly preferred embodiment of the invention, the front end portion has an outer surface that is externally-threaded, and the front, middle and rear tubular portions and said inner channel of said housing are generally cylindrical. Most desirably, the plurality of holes are arranged in a plurality of spaced-apart rows arranged radially spaced apart about said middle portion. Most advantageously, the ball is made of rubber.

BRIEF DESCRIPTION OF THE DRAWINGS

Other objects and features of the present invention will become apparent from the detailed description considered in connection with the accompanying drawings, which disclose several embodiments of the invention. It is to be understood that the drawings are to be used for the purpose of illustration only and not as a definition of the limits of the invention.

DETAILED DESCRIPTION OF THE PREFERRED AND ILLUSTRATED EMBODIMENT

Figure 1:
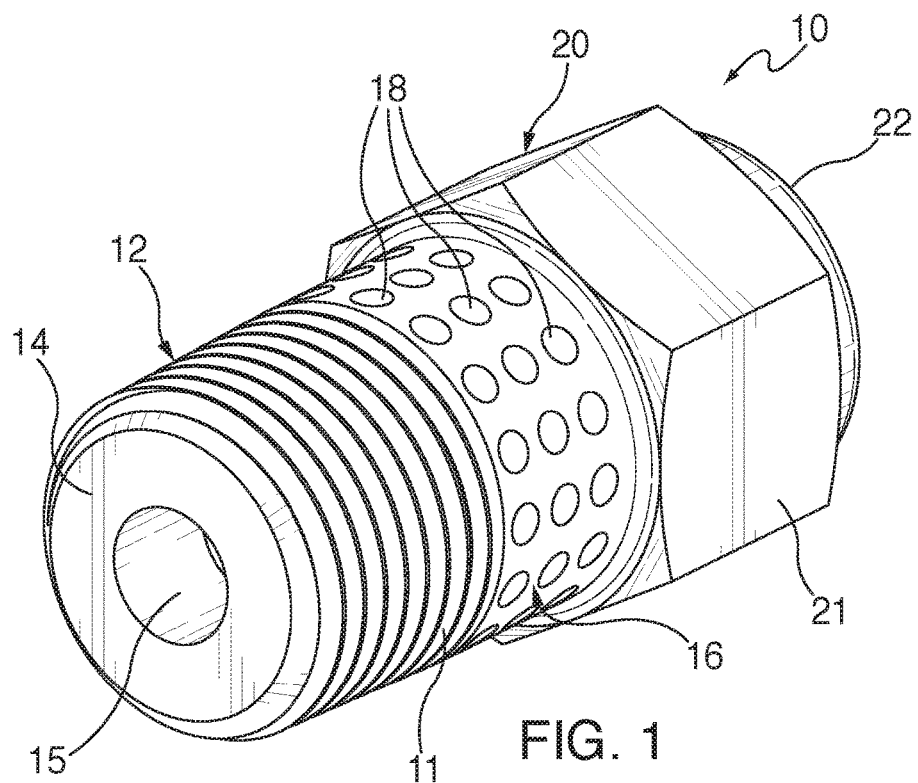
FIG. 1 is a front, top, and side perspective view of the vacuum pump silencer embodying the present invention.
Figure 2:
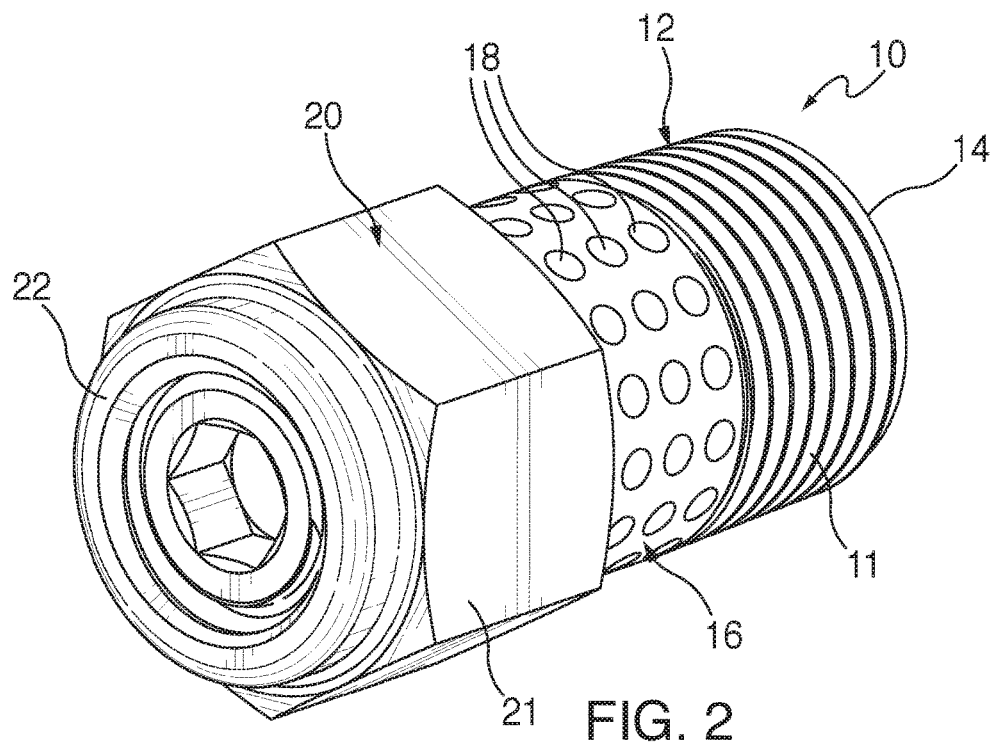
FIG. 2 is a rear, top, and side perspective view of the silencer shown in FIG. 1.
Figure 3:
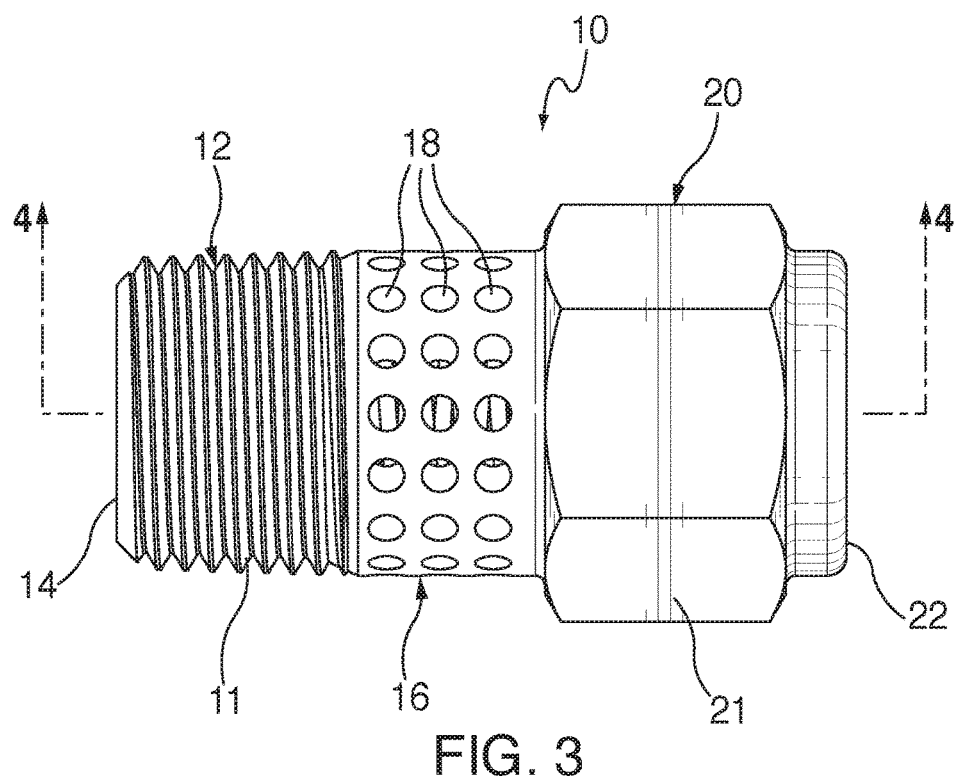
FIG. 3 is a side elevational view of the silencer shown in FIG. 1.
Figure 4:
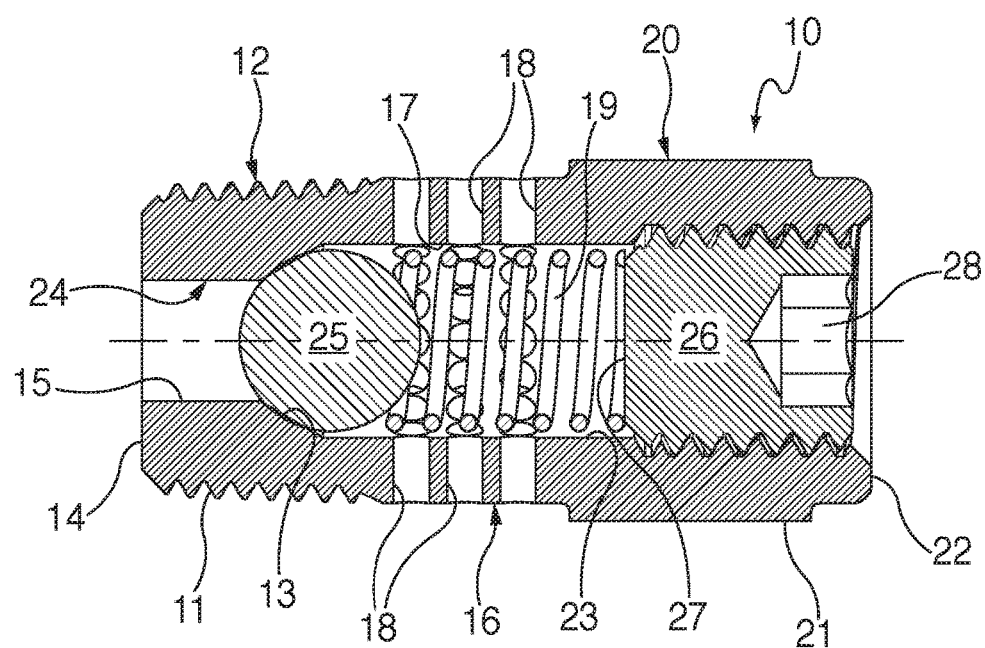
FIG. 4 is a cross-sectional view of the silencer taken along line 4-4 of FIG. 3.

Turning now in detail to the drawings, therein illustrated is a novel silencer embodying the present invention especially intended for vacuum pumps (not shown). The silencer consists of an elongated, preferably cylindrical annular housing generally designated by reference numeral 10. Housing 10 comprises an externally-threaded, annular front end portion 12 which is intended to be attached to an internally-threaded discharge port of a vacuum pump (not shown), a perforated annular middle portion 16 and an annular rear end portion 20 having an enlarged outer surface in the shape of a hexagonal nut 21, as well as a front end 14 and a rear end 22. As seen best in FIG. 4, the internal surface of cylindrical housing 10 defines a central, generally cylindrical channel or passageway, generally designated by reference number 24, extending from its front end 14 to its rear end 22.

In front end portion 12, channel 24 comprises a central intake port 15 adjacent front end 14, which merges downstream with an enlarged rounded shoulder 13 which, in turn, merges with a perforated cylindrical wall section 17 of middle portion 16 which has a diameter slightly greater than the intake port. Wall section 17 merges with an equally sized smooth front portion of rear wall section 23 to provide a smooth transition thereto. The rear portion of rear wall section 23 is internally threaded extending to rear end 22 of housing 10.

A ball 25 is disposed in channel 24 adjacent shoulder 13 of front end portion 12 which serves as a valve seat. The perforated middle portion 16 of housing 10 has three rows of spaced apart, radially-extending throughbores 18 which serve as discharge ports or vents for housing 10, as discussed further below. An externally threaded set screw 26 is threadably received in the internally threaded rear segment of rear wall portion 23. Set screw 26 has a rear end in which there is a hexagonally-shaped blind bore 28. A set screw tool (not shown) can be inserted into set screw bore 28 and turned to adjust the set screw's longitudinally axial position within rear end portion 20 to thereby enlarge or decrease the volume of channel 24 between ball 25 and the front end 27 of set screw 26. Finally, a coil spring 19 is compressed and retained axially within channel 24 between ball 25 and the front end 27 of set screw 26, the latter of which serves as a spring stop. Coil spring 32 is disposed to normally bias ball 25 against the shoulder 13 to block off the center intake port 15. Consequently, movement of the set screw 26 adjusts the spring tension which allows for different operating pressures.

To install the silencer 10 on a vacuum pump, the hexagonal head 21 of the rear end portion 20 is rotated clockwise until the externally threaded section 11 of front end portion is securely received in the internally-threaded exit port of a vacuum pump or an adaptor therefor (not shown). During operation of the vacuum pump, the air exits the discharge port of the pump (not shown) and enters the intake port 15 of the silencer 10. The pressure at the intake caused by the fluid flow moves ball 25 off the valve seat defined by shoulder 13 to compress the spring 19 further and lift the ball 25 from its seat 13, thus creating a flow path whereby the air is then discharged or vented through the multiple equally-distributed radial openings 18 in the middle portion 16 of the housing 10. The bores 18 are distributed such that they offer the greatest surface coverage possible of the channel 24 defined by middle portion 16. Ball 25 is preferably made of rubber to reduce the noises caused by the valve opening and closing or from the possible vibrations.

Accordingly, it is to be understood that the embodiment of the invention herein described is merely illustrative of the application of the principles of the invention. It is not intended that the invention be limited thereto, as it is intended that the invention be as broad in scope as the prior art will allow and that the specification be read likewise.

For example, although the silencer components are preferably made of metal, they could also be made of synthetic plastic or composite materials. Also the size, dimensions and configuration of the various components can be modified to suit their particular application. Furthermore, while the front end portion of the silencer is preferably externally threaded for attachment to the vacuum pump discharge port, other types of quick release mechanical connectors or fasteners could be employed depending on the vacuum pump discharge port configuration and/or the intended application parameters.

It will therefore be appreciated by those skilled in the art that other modifications could be made thereto without departing from the spirit and scope of the invention.

What is claimed is:

1. A silencer for reducing noise generated by a fluid discharge at a discharge port of a vacuum pump, comprising:
    a housing having an inlet end attachable to the discharge port of the vacuum pump and an inner channel having an inlet port for receiving fluid discharge of the vacuum pump and a plurality of outlet ports for discharge of said fluid received from the discharge port of the vacuum pump; and
    valve means disposed in said inner channel for regulating the discharge rate of the fluid through said outlet ports in response to fluid discharge from the vacuum pump, said valve means comprising a coil spring and a ball forming a valve that opens under pressure of fluid discharge from the vacuum pump and allows for the discharge of fluid through said plurality of outlet ports.

2. The silencer according to claim 1, wherein said valve means additionally includes a set screw for adjusting the biasing force of said coil spring against said ball.

3. The silencer according to claim 2, wherein said housing has a tubular front end portion which defines said inlet end and said inlet port of said inner channel and wherein said front end portion has an inner surface defining a rounded shoulder in said inner channel which serves as a valve seat for said ball.

4. The silencer according to claim 3, wherein said housing has a tubular middle portion with a plurality of holes extending therethrough which serve as said plurality of outlet ports.

5. The silencer according to claim 4, wherein said housing has a rear tubular portion with a polygonally shaped outer surface and an internally threaded inner surface, and wherein said set screw is externally threaded for threadably engagement with said internally threaded inner surface of said rear tubular portion to allow positional adjustment of said set screw in said rear tubular portion, to, in turn, adjust the biasing force of said spring against said ball.

6. The silencer according to claim 5, wherein said front end portion has an outer surface that is externally-threaded.

7. The silencer according to claim 6, wherein said front, middle and rear tubular portions and said inner channel of said housing are generally cylindrical.

8. The silencer according to claim 7, wherein said plurality of holes are arranged in a plurality of spaced-apart rows arranged radially spaced apart about said middle portion.

9. The silencer according to claim 8, wherein said ball is made of rubber.

* * * * *